Aug. 23, 1938. J. A. SPENCER Re. 20,835

THERMOSTATICALLY CONTROLLED DEVICE

Original Filed April 9, 1934 2 Sheets-Sheet 1

John A. Spencer,
Inventor,
Delos F. Haynes,
Attorney.

THERMOSTATICALLY CONTROLLED DEVICE

Original Filed April 9, 1934 2 Sheets-Sheet 2

John A. Spencer,
Inventor,
Delos G. Haynes,
Attorney.

Reissued Aug. 23, 1938 Re. 20,835

UNITED STATES PATENT OFFICE 20,835

THERMOSTATICALLY CONTROLLED DEVICE

John A. Spencer, Newtonville, Mass., assignor, by mesne assignments, to Metals & Controls Corporation, Attleboro, Mass., a corporation of Massachusetts Original No. 2,040,762, dated May 12, 1936, Serial No. 719,704, April 9, 1934. Application for reissue November 19, 1936, Serial No. 111,647

7 Claims. (Cl. 158—117.1)

This invention relates to thermostatically controlled devices and, with regard to certain more specific features, to thermostatically controlled devices such as valves and electric switches having a manual reset mechanism.

Among the several objects of the invention may be noted the provision of a thermostatically controlled device of the class described which performs an opening or closing function automatically upon the attainment of a predetermined temperature condition but which is incapable of performing the respective reverse function without manual actuation; the provision of a device of the class described which performs its automatic function with a snap-action without the use of latches, pivot points, or toggles thus operating with less friction and hence being more accurate in its response to temperature change; and the provision of a device of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal cross-section of a valve embodying the present invention;

Similar reference characters indicate corresponding parts throughout the several views of the drawings.

The present invention applies to control devices of all types wherein a response is to be made to temperature variations. Principal among such control devices are valves and electric switches, which accordingly constitute the more usual controlled or actuated elements falling within the scope of the invention. The invention, in principle, applies equally well to these and other types of control devices, but for purposes of description, the application of the invention to devices of those two characters will suffice.

Figure 1:
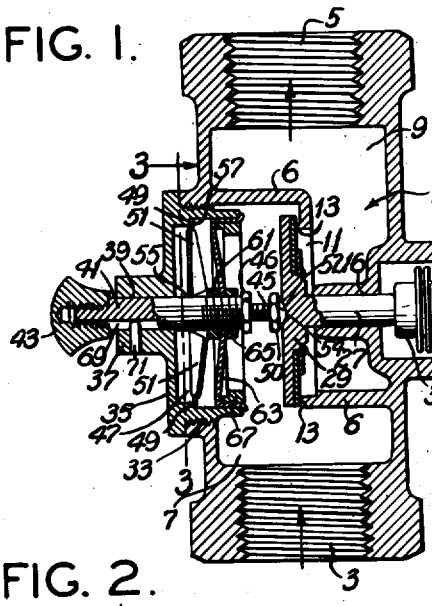
Figure 4:
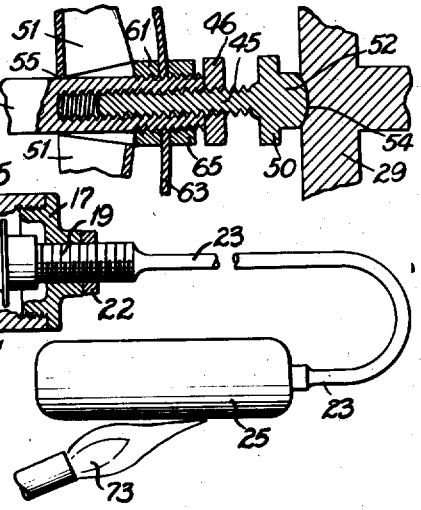
Fig. 4 is an enlarged fragmentary view of a portion of Fig. 1.

Referring now more particularly to Fig. 1, numeral 1 indicates a valve body having an inlet 3 and an outlet 5 respectively. The body 1 includes an internal chamber, which is divided by a customary partition 6 into an inlet chamber 7 and an outlet chamber 9. The partition 6 includes an opening 11, which provides a valve seat 13, in the usual manner.

Extending in one direction from the valve casing 1 at right angles to the plane of the opening 11, is a cylindrical housing member 15, which inwardly terminates in a bearing portion 16. The member 15 is closed at its outer end by a threaded plug 17. The plug 17 has a central threaded opening to receive the threaded stem 19 of a flexible bellows 21. The relative position of the bellows 21 in the cylindrical member 15 may be adjusted by threading the stem 19 into and out of the plug 17. A lock nut 22 holds the bellows in position once it is established.

Sealed to the outer end of the stem 19 is a so-called capillary metallic tube 23, which is sufficiently flexible to permit of its being bent, without breaking, during installation of the device. To the other end of the tube 23 is affixed a bulb 25. The bulb 25, tube 23, stem 19 and bellows 21 are all sealed together in a closed arrangement, so that no leakage of a fluid in the system may take place.

The bearing portion 16 slidably receives a stem 27 to which is affixed valve closure element or disc 29. The disc 29 is adapted to seat upon the valve seat 13, in order to place the valve in closed condition so that communication between inlet 3 and outlet 5 is cut off. The opposite end of the valve stem 27 abuts the inner end 31 of the bellows 21.

On the opposite side of the valve casing is provided a threaded opening 33 which is coaxial with the cylindrical housing 15. Into the opening 33 fits a threaded cap or plug 35, which outwardly terminates in a bearing portion 37. The bearing portion 37 includes a central opening 39 through which slides a stem 41. To the outer end of the stem 41 is threaded a manually operative knob 43. The inner end of the stem 41 (see Fig. 5) is drilled and threaded to receive an adjustable threaded extension 45 which is unattached to but abuts against the valve closure element 29 and is locked after adjustment by a lock nut 46. The extension 45 has a hexagonal portion 50 for convenience in adjusting and has a spherical end surface 52 for abutting against the valve closure element 29. The valve closure element 29 has a corresponding spherical depression 54.

Figure 3:
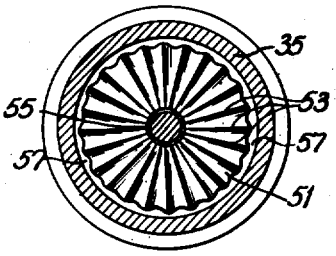
Fig. 3 is a lateral cross-section taken substantially along line 3—3 of Fig. 1.

The cap 35 is inwardly shaped to provide a cylindrical opening 47, which has an annular shoulder 49 near its bottom. Seated peripherally upon the shoulder 49 is a snap-acting corrugated disc 51, which comprises in effect an actuator for the valve assembly. The disc 51 is preferably made in accordance with the teachings of my copending patent application, Serial No. 653,702, filed January 26, 1933, for Snap acting device, now Patent No. 1,972,172, granted September 4, 1934. It comprises (see also Fig. 3) a disc of resilient metal, such as spring brass, steel or the like, which is provided with a relatively large number of radial corrugations 53, a central opening 55, and a flat uncorrugated rim portion 57. It is the flat rim portion 57 that seats upon the shoulder 49. The disc 51 is initially formed in such manner that its general shape is slightly conical in one direction. As a result of the initial shaping of the disc, it may be over-centered by applying a force to occupy a conformation of conicity in the opposite direction.

Figure 2:
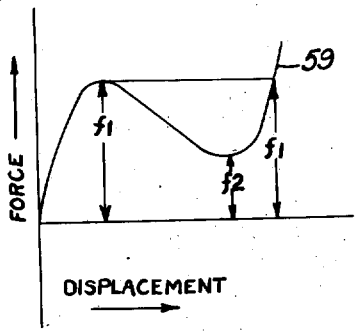
Fig. 2 is a graphical presentation showing certain force-displacement characteristics of an actuating element of the valve of Fig. 1.

The disc 51 is distinctive in its characteristic curve for the applied force against the displacement, which is shown in Fig. 2. While this curve is described in more detail in my said patent, No. 1,972,172, it will also be described herein, but only to the extent necessary to enable a full understanding of the present invention.

Considering zero displacement to represent the conformation of the disc as it is initially shaped, and considering the distance through which the central portion of the disc travels in over-centering as a finite positive displacement, the curve indicated by numeral 59 in Fig. 2 represents the characteristic displacement to be had for increasing applied forces. Following the curve 59 from the origin, it will be noted that at first relatively little displacement is obtained as the applied over-centering force is increased until said force builds up to a value *f1*. However, the instant after the force *f1* has been achieved, displacement will increase rapidly even under an applied force less than the value of *f1*. That is to say, in the portion of the curve 59 immediately beyond its first crest, the displacement increases with a decreasing applied force, which is, of course, contrary to the ordinary type of spring, which obeys Hooke's law. Thus, the force may be gradually decreased along values determined by the curve 59, with the displacement none the less increasing. This action continues until the force has diminished to a value *f2*. Thereafter, according to the curve 59, it is again necessary to increase the applied force in order to procure an increased displacement. The portion of the displacement to the right of *f2* on the curve is not used, the disc being stopped from being displaced further by the inside surface of the cap 35. If the force *f1* is applied by a resilient spring or by a resilient thermostatic element, such as the bellows 21, having a force displacement curve with a slope less than that of the curve of Figure 2 between *f1* and *f2*, an accelerated movement or snap of the center of the disc will occur from the *f1* to the *f2* position.

From the above, it will be seen that the following action is characteristic of the disc 51: From its initial zero displacement position, it requires a relatively large force *f1* to initiate any considerable degree of displacement. But once the force *f1* has been reached, the applied force may be diminished and the displacement will still be increased. The force *f2* will be sufficient to hold the disc in a position of comparatively great displacement, although a larger force *f1* has been necessary to get the disc to such a displacement. For purposes of brevity, the Fig. 1 position of the disc with the displacement less than that corresponding to a force *f1* will hereinafter be termed the position of "absolute stability" of the disc, and the position of the disc in its displaced position under the force *f2* will be called the position of "comparative stability". The peculiar application of this type of disc in the valve of the present invention will be made apparent hereinafter.

Returning to Fig. 1, it will be seen that a nut or collar 61 is threaded on the stem 41 in a position to be abutted by the inner periphery of the disc 51. The nut 61, also provides one abutment for a flexible diaphragm 63. The diaphragm 63 is clamped against the nut 61 by a second nut 65 so that a leak-proof joint between the diaphragm 63 and the stem 41 is afforded. The outer periphery of the diaphragm 63 is tightly clamped against the inner surface of the cap 35 by means of a rim or plug member 67, which is forced into its position. Thus, leakage through the mechanism enclosed within the cap 35 is prevented.

In order to prevent the stem 41 from turning in the bearing 37, the stem 41 is provided with a longitudinal groove 69, into which fits a pin or key 71 radially disposed in the bearing portion 37. Groove 69 permits longitudinal motion of the stem 41 but prohibits rotative motion thereof.

The nuts 45, 61, and 65 are initially so adjusted that the resilient force of the disc 51, when in its position of absolute stability, is brought to bear upon the stem 41 in such manner as to tightly seat the valve closure element 29 upon the valve seat 13. The spring reaction of the disc 51 is between the nut 61 and the shoulder 49.

The operation of the valve as thus described is as follows:

The system comprising the bellows 21 and bulb 25 is filled with a fluid or gas or the like which undergoes considerable volume change upon change of temperature. The choice of the fluid or gas to be used depends upon the range of temperature in which the device is to be used. Argon, for example, has been found best in the present instance because of the high temperature at which it is desired to operate the bulb. Argon is an inert gas even at high temperatures and the walls of the container are less permeable to it than to other inert gases. Under what will hereinafter be termed "cold" conditions, the volume of the fluid is such that the end 31 of the bellows 21 exerts a force substantially less than *f2* upon the stem 27. This adjustment may be effected by loosening the nut 22 and rotating the threaded stem 11 to regulate the longitudinal position of the bellows 21 in the cylindrical housing 15, and thereafter retightening the nut 22.

If the bulb 25 is now heated, as by a pilot flame indicated by numeral 73, the fluid in the system will expand and tend to move the end 31 of the bellows 21 into the valve assembly in order to relieve the increased volume due to the heat. The adjustment of the bellows 21 in the housing 15, however, is so arranged that under normal temperature conditions the inward force of the bellows 21 is never permitted to build up to the value *f1* for the particular disc 51 used, although a force slightly exceeding *f2* is reached.

If, now, the bulb 25 is in its heated condition, and the knob 43 is manually grasped and pulled (to the left in Fig. 1), the manual force will over-center the disc 51 to its position of comparative stability, and the force supplied by the pressure of the bellows 31 will be sufficient to hold said disc 51 in its position of comparative stability and hence hold the valve open. When, now, the pilot flame 73 goes out, the fluid in the bulb 25 cools and the pressure of the bellows 21 is relieved. This means that the force supplied by the bellows 21 decreases below the value *f2*. Therefore the disc 51 will at once return to its position of absolute stability, at the same time closing the valve. Subsequent heating of the bulb 25, as by reignition of the burner 73, will not provide sufficient force again to open the valve by itself, but manual pulling of the knob 43 is necessary.

A particular advantage of a valve constructed in this manner is the promptness with which it may be said to go "off" immediately after the flame 73 has been extinguished. It will be understood that the action of the fluid in the bulb 25 is essentially a thermostatic one, that is, control is effected in accordance with the temperature of the fluid. Now, with all snap-acting thermostatic devices there is present what is known as an operating differential. That is to say, on decreasing temperature, an action will be performed when a temperature, say 100° is achieved, while on increasing temperature with the same device, a contrary action will be achieved with a temperature of say 150°. The difference between these values (e. g. 50°) represents what is spoken of as the operating differential of the thermostat. Now, in connection with safety devices of the type herein concerned, it is desirable that the operating temperature differential be reduced to an absolute minimum, for it is advantageous, of course, to shut off the flow of gas immediately upon extinguishment of the pilot burner. The valve described is so designed that thermostatic operation is had only upon the lower value of the two limit figures going to make a temperature differential. The upper value is, for practical purposes, beyond reach, and is replaced by the manual actuation of the valve to open position. Thus, the valve as described may be adjusted so that the normal temperature induced by the pilot flame 73 is just sufficient to provide a force at the bellows 21 which very slightly exceeds the value *f2* for the particular disc 51 employed. Then, almost instantaneously after the flame 73 is extinguished the slight drop of temperature in the bulb 25 is sufficient to cause the pressure in the bellows 21 to decrease below the value *f2* and hence cause the valve to close.

It is desirable that the disc 51 be so mounted that its motion in the valve-seating direction is limited to the extent that the maximum force *f1* presses the valve closure element 29 against its seat 13 thus providing a good pressure for holding the valve closed.

Figure 5:
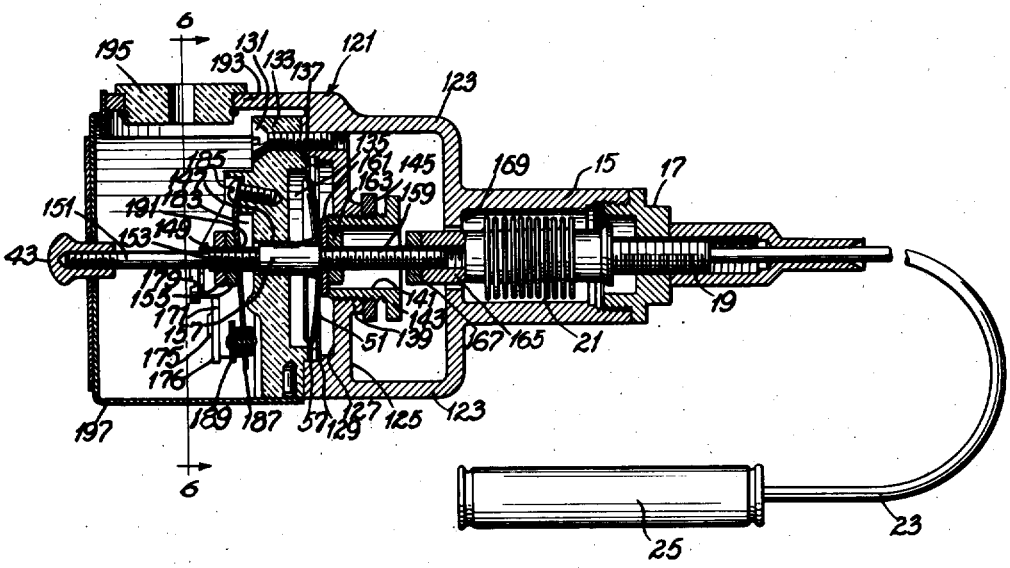
Fig. 5 is a longitudinal cross-section of an electric switch embodying the present invention; and, Fig. 6 is a lateral cross-section taken substantially along line 6—6 of Fig. 6.
Figure 6:
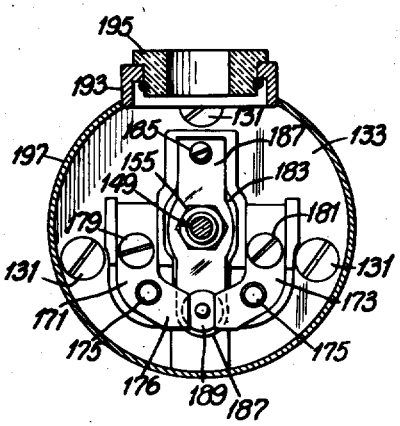

The invention, when applied to an electric switch as the controlled or actuated element, operates upon the same basic principles. For example, Figures 5 and 6 show the adaptation of the invention to an electric switch for use in the same type of circuits as the valve embodiments described. The embodiment shown in Figures 5 and 6 is in many respects similar to the valve embodiment of Fig. 1, insofar as the thermal actuating element is concerned.

Referring to Fig. 5, it will be seen that a body member indicated generally by numeral 121 is provided, comprising a cylindrical bellows housing 15 joined by two arms 123 to a circular base portion 125. The housing 15, which is similar in all respects to the housing 15 in Fig. 1, contains the bellows 21, and is closed by a plug or cap 17, into which the stem 19 of the bellows 21 is threaded. Other details are like the Fig. 1 embodiment described.

The circular base portion 125 has in the outer face thereof, a circular depression 127. The edge of the depression 127 is provided with an annular shoulder 129, against which rests the flat rim 57 of the radially corrugated disc 51 (identical, in itself, to the discs of the valve embodiment described). Fitted against the outer face of the base 125, and secured in place by screws 131, is a circular block of insulating material 133, which has a central depression 135 which, in assembly, faces the depression 127 in the wall 125 and thus provides a cylindrical chamber in which the disc 51 can snap. An annular rim or projection 137 for the depression 135 fits against and clamps the flat rim 57 of the disc 51 loosely in position against the shoulder 129.

The center of the base 125 is provided with a bushing 139, which threadedly receives a hollow plug or nipple 141 having a polygonal head 143 for turning it. A lock nut 145 secures the plug 141 in position once it has been adjusted.

Passing through a central bearing hole 147 in the block 133, the central hole 55 of the disc 51, and the hollow plug 141, is a main stem 149 similar, in many respects, to the stem 27 of the Fig. 1 embodiment. The stem 149 has a forward portion 151 of reduced diameter, and is threaded at its end to receive the manual control knob 43. A threaded portion 153 receives nuts 155, the purpose of which will be made clear hereinafter. A smooth portion 157 slides in the hole 147, and passes through the central hole 55 of the disc 51. The remainder of the stem 149 is threaded as at numeral 159, and carries a washer 161 held tight against the shoulder formed by the reduction in size from smooth portion 157, by a nut 163. The washer 161 forms an abutment for the edges of disc 51 whereby it is operatively connected to the stem 149. The adjustable nipple 141, against which the other side of washer 161 abuts, will thus be seen to comprise a movement-limiting adjustable stop for the disc 51, performing in this respect an analogous function to that of the adjustable screw 45 of the Fig. 1 embodiment.

At the extreme end of the stem 149 is provided a long nut 165, which is locked against movement by a nut 167. The nut 165 extends beyond the end of the stem 149 for adjustment and extends through a hole 169 in the end-wall 123 and is in position to be abutted by, and hence susceptible to the movement of, the bellows 21.

The electrical elements of the switch are shown more clearly in Fig. 6. They comprise a pair of terminal pieces 171 and 173 which are mounted upon the insulation block 133 by rivets 175. Each terminal piece has an upstanding, facing projection 176 and 177, respectively, a gap being left therebetween. The terminal pieces likewise have connecting screws 179 and 181, respectively, by which electrical connections are made to the switch. Mounted on a projection 183 from the block 133, by means of a screw 185, is a strip 187 of resilient metal, the free end of which carries a universally-jointed contact button 189, and which is provided with a hole 191 to receive the stem 149. The lock nuts 155 bear against outer side of strip or lever 187. The contact button 189 is of such size, and so positioned, as to move into and out of contact with the terminal-piece projections 175 and 177, whereby the switch makes and breaks connections.

A projection 193 from the base portion 125 carries a bushing 195 made of insulating material, through which bushing 195 are passed the wires for making connections to the switch. A cup-shaped cover 197 (with a notch to accommodate the projections 193) fits on the casing 121 and completely encloses the working parts of the switch. Only the manual knob 43 passes through the cover 197.

The operation of this embodiment of the invention is similar to that of the embodiment heretofore described, with the exception that electrical switching elements, in place of valve elements, are the primary actuated means. Normal position, with the switch disconnected, is shown in the drawings, and the actuating disc 51 is then in its convex-to-the-right position. This is also the position of absolute stability of the disc. The actual displacement of the disc to the right (and hence its operating resistance) is controlled by adjusting the position of the plug 141.

When, now, the knob 43 is grasped and pulled to the left (Fig. 5), the disc 51 is overcentered to its position of comparative stability, in which position it is held if the pressure of the bellows 21 (and hence the external temperature) is high enough to exceed the value *f2* of the chart, Fig. 2. If the temperature drops sufficiently, the pressure of the bellows 21 decreases below the value *f2*, and thereupon the disc snaps back to its position of absolute stability. When the disc is in its position of absolute stability, the switch is open, button 189 being out of bridging relation with respect to the projections 175 and 177. When, however, the disc 51 is in its position of comparative stability, the contact button 189 bridges or connects the projections 175 and 177 and connections are thus made. Automatic opening of the switch takes place in the same manner, and for the same reason, as the automatic closing of the valves hereinbefore described. It will readily be apparent, however, that the order of the positions of the disc with relation to the position or condition of the contact elements might be reversed, should the occasion demand.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A temperature controlled device comprising actuated control means, actuating means for said control means, said actuating means comprising a radially corrugated snap-acting resilient metal disc having a position of absolute stability and a position of comparative stability, and being characterized in that the force required to initiate movement of said disc from its position of absolute stability to its position of comparative stability is greater than the force required to maintain said disc in its position of comparative stability, thermally responsive means comprising a bulb and bellows unit positioned to react upon said actuating means and, under proper thermal conditions, to supply the force necessary to maintain said disc in its position of comparative stability, said thermally responsive means, however, being incapable, under normal temperature variations, of supplying a force sufficiently great to initiate movement of the disc from its position of absolute stability to its position of comparative stability, and manually operable means for supplying sufficient force to move said disc from its position of absolute stability to its position of comparative stability.

2. A temperature controlled device as set forth in claim 1 in which the actuated control means comprises a valve closure element, and in which the actuating means operates on one side of said element, while the thermally responsive means operates on the other side of said element.

3. A temperature controlled device as set forth in claim 1 in which the actuated control means comprises a valve closure element, and in which the actuating means operates on one side of said element, while the thermally responsive means operates on the other side of said element, both said actuating means and said thermally responsive means being free of any permanent attachment to said valve closure element.

4. A temperature controlled device as set forth in claim 1 in which the actuated control means comprises a valve closure element, said element having a stem extending from one side thereof, bearing means for said stem, said thermally responsive means operating on the remote end of said stem, while said actuating means operates on the opposite face of said element.

5. A control valve comprising a valve housing having inlet and outlet openings with a valve seat therebetween, a closure member threading into said housing above said seat and having a cup-shaped recess in the inner face thereof, a valve member in said housing cooperating with said valve seat and having a valve stem extending from said housing oppositely of said closure member, a resetting stem reciprocable in said closure member and having means at its lower end engaging said valve member, spring means in said recess biasing said resetting stem toward valve closing position and sealed from the interior of said housing, and means on said stem operative to render said spring means inoperative.

6. A control valve comprising a valve housing having a valve seat therein, a valve member cooperating with said seat and having a valve stem extending outwardly of said housing, a closure member secured in said housing above said seat and carrying resetting means normally urging said valve member to closed position, said housing having an integral valve stem guide provided with an enlarged outwardly extending cylindrical portion encircling said stem, a pressure responsive member acting on the outer end of said stem within said cylindrical portion, and adjusting means closing the outer end of said cylindrical portion and engaging a portion of said pressure responsive member.

7. In combination, a valve housing, a valve member in said housing having a depending valve stem, expansive means at the end of said stem operable to react upon said stem in accordance with temperature variations at remotely disposed pressure developing means, a closure member for said housing disposed over said valve, a reset stem carried by said closure member and projecting therefrom, means at the inner end of said reset stem bearing against the upper surface of said valve member, spring disc means disposed about said reset stem within said closure member and normally urging said reset stem downwardly against said valve member, means carried by said reset stem for snapping said disc into inoperative position, and means for sealing said reset stem and disc means from the interior of said housing.

JOHN A. SPENCER.